(12) United States Patent
Marquoin et al.

(10) Patent No.: US 9,586,301 B2
(45) Date of Patent: Mar. 7, 2017

(54) DEVICE FOR HOLDING A TURBINE ENGINE BLADE FOR THE PURPOSES OF MACHINING

(75) Inventors: Thomas Marquoin, Chatenay Malabry (FR); Olivier Dupouy, Levallois-Perret (FR)

(73) Assignee: SNECMA, Paris (FR)

( * ) Notice: Subject to any disclaimer, the term of this patent is extended or adjusted under 35 U.S.C. 154(b) by 356 days.

(21) Appl. No.: 14/127,386

(22) PCT Filed: Jun. 7, 2012

(86) PCT No.: PCT/FR2012/051286
§ 371 (c)(1),
(2), (4) Date: Dec. 18, 2013

(87) PCT Pub. No.: WO2012/175840
PCT Pub. Date: Dec. 27, 2012

(65) Prior Publication Data
US 2014/0191455 A1    Jul. 10, 2014

(30) Foreign Application Priority Data
Jun. 21, 2011   (FR) ...................................... 11 55464

(51) Int. Cl.
*B23Q 3/06*          (2006.01)
(52) U.S. Cl.
CPC ............. *B23Q 3/063* (2013.01); *B23Q 3/061* (2013.01)
(58) Field of Classification Search
CPC ................................ B23Q 3/063; B23Q 3/061
(Continued)

(56) References Cited

U.S. PATENT DOCUMENTS

| 1,551,342 A * | 8/1925 | Steenstrup | ............ | B23P 15/006 |
| | | | | 269/153 |
| 4,327,495 A * | 5/1982 | Plante | .................. | G01B 5/0002 |
| | | | | 29/407.05 |

(Continued)

FOREIGN PATENT DOCUMENTS

| DE | WO 2006074650 A1 * | 1/2006 |
| DE | 102004056142 A1 * | 6/2006 |

(Continued)

OTHER PUBLICATIONS

International Search Report Issued Oct. 24, 2012 in PCT/FR12/51286 Filed Jun. 7, 2012.

*Primary Examiner* — Larry E Waggle, Jr.
*Assistant Examiner* — Mahdi H Nejad
(74) *Attorney, Agent, or Firm* — Oblon, McClelland, Maier & Neustadt, L.L.P.

(57) ABSTRACT

A device for holding a turbine engine blade for purposes of machining, the device including a support including at least one housing in which at least one block is removably mounted, the block including two jaws presenting an opening for mounting an airfoil of a blade. The block further includes six presser points for pressing against the airfoil, and a movable presser finger for pressing against a pressure side surface or a suction side surface of the blade, the finger being moved by an actuation mechanism such that in a blade clamping position, the presser finger presses the blade against the presser points of the block, which itself is pressed against the support.

13 Claims, 6 Drawing Sheets

(58) Field of Classification Search
USPC .......... 269/9, 95, 10; 29/889.2, 889.21, 235; 81/54
See application file for complete search history.

(56) References Cited

U.S. PATENT DOCUMENTS

| | | | | | |
|---|---|---|---|---|---|
| 4,710,608 | A | * | 12/1987 | Noda | B23K 37/0426 219/125.1 |
| 4,829,720 | A | | 5/1989 | Cavalieri | |
| 4,836,518 | A | * | 6/1989 | Janutta | B23Q 3/063 269/37 |
| 5,690,323 | A | * | 11/1997 | Puttmer | B23B 31/16275 269/20 |
| 6,158,730 | A | * | 12/2000 | Coffey | B25B 5/08 269/236 |
| 8,061,699 | B2 | * | 11/2011 | Wang | B23Q 3/061 269/287 |
| 2005/0268462 | A1 | * | 12/2005 | Beverley | B23Q 3/063 29/889.21 |
| 2009/0278294 | A1 | * | 11/2009 | Wang | B23Q 3/061 269/9 |
| 2010/0083796 | A1 | * | 4/2010 | Nelson | E21B 19/164 81/57.18 |
| 2013/0167337 | A1 | * | 7/2013 | Dupouy | B24B 9/04 29/23.51 |
| 2014/0064974 | A1 | * | 3/2014 | Simmons | B23Q 1/035 416/204 R |
| 2016/0107279 | A1 | * | 4/2016 | Horn | B23Q 3/063 29/23.51 |

FOREIGN PATENT DOCUMENTS

| | | | |
|---|---|---|---|
| DE | WO 2009124533 A1 | * | 4/2009 |
| EP | 1 321 236 | | 6/2003 |
| FR | 2 879 117 | | 6/2006 |
| FR | 2964585 | * | 9/2010 |
| FR | 2964585 A1 | * | 9/2010 |
| FR | 2976203 A1 | * | 6/2011 |
| FR | 2979272 A1 | * | 8/2011 |

* cited by examiner

DEVICE FOR HOLDING A TURBINE ENGINE BLADE FOR THE PURPOSES OF MACHINING

BACKGROUND OF THE INVENTION

Field of the Invention

The present invention relates to a device for holding a turbine engine blade for the purposes of machining.

Description of the Related Art

A turbine engine blade comprises an airfoil that is to be placed in a gas-flow passage, and a root that is to be engaged in a slot in a disk. The airfoil and the root are separated by a platform defining a portion of the inside wall of the gas-flow passage.

When fabricating a blade, it is conventional to use forging or casting to make an un-finished part having dimensions that correspond to the finished dimensions, so far as the airfoil-forming portions is concerned. In contrast, the portion that is to form the root is no more than a blank that needs to be machined in order to give it its final shape and dimensions.

Once machined, the blade root still has projecting edges of angles that need to be rounded or smoothed during an operation referred to as fitting or radiusing.

A blade root is generally radiused manually by an operator who machines the projecting edges using a carbide bur or a brush, for example. Since that radiusing operation is manual, dimensional differences can appear from one blade to another or from one operator to another.

If the radiusing of a blade root is performed in insufficient or inaccurate manner (e.g. because the projecting edge is not sufficiently rounded), fabrication operations further downstream may suffer. This happens in particular when shot blasting a poorly-radiused blade root, since some of the beads of shot can be deformed by an edge that projects too much. A projecting edge also gives rise to stress concentrations that lead to premature cracking of the blade root.

Dimensional differences between the blade roots can also complicate assembling the roots in the slots of disks.

Finally, manual radiusing operations are complex and expensive.

Patent application FR 10/57384, in the name of the applicant and not yet published, discloses a method of radiusing blade roots with the help of a numerically-controlled machine. While they are being radiused, the blades are held in tooling comprising a support having housings formed therein. The airfoil of the blade is clamped between two jaws that are hinged together at one end and fastened together at the other end with the help of a first screw. The jaws have presser studs for pressing against the blade. Once the blade is in place between the jaws, a second screw provided on one of the jaws serves to press the blade against the above-mentioned presser points. The jaws and the blade are then mounted in a housing of the support and they are held therein with the help of latches.

A plurality of blades can thus be mounted simultaneously on the support of the tooling in different housings, in order to be subjected to radiusing.

Nevertheless, installing and removing the blades is time-consuming. Specifically, after radiusing, for example, when it is desired to remove a blade, it is necessary to move the latches, to withdraw the jaws together with the blade from the housing in the support, and to unscrew the second screw in order to be able to withdraw the airfoil from the jaws.

Also, such a mounting does not make it possible to know accurately the position of the blade relative to the support. Specifically, the jaws are mounted in the housing of the support with a small amount of mounting clearance such that, even if the blade is correctly positioned on its presser points, it is not possible to know exactly the position of the jaws (and thus of the blade) relative to the support that constitutes a known frame of reference.

BRIEF SUMMARY OF THE INVENTION

A particular object of the invention is to provide a solution to those problems that is simple, effective, and inexpensive.

To this end, the invention proposes a device for holding a turbine engine blade for the purposes of machining, the device comprising a support having at least one housing in which at least one block is mounted in removable manner, said block presenting an opening for mounting an airfoil of a blade and having at least six presser points for pressing against the airfoil, the device being characterized in that it has a movable presser finger for pressing against a pressure side surface or a suction side surface of the blade, the finger being moved by actuation means in such a manner that in a blade clamping position, the presser finger presses the blade against the presser points of the block, which itself is pressed against the support.

This makes it easier to install and remove a blade. Specifically, for mounting purposes, it suffices to insert the blade in the opening in the block (which may already be mounted in the housing in the support), and then to actuate the presser finger so that the blade and the block are pressed respectively against the presser points and against the support in such a manner as to fasten them on the support. To remove the blade, it suffices to actuate the presser finger in the opposite direction so that the blade can be withdrawn from the block.

There is therefore no need to remove the block from the housing in the support, nor is there any need to tighten or loosen one or more screws, as is necessary in the prior art.

Also, the position of the block relative to the support is known exactly since the block is pressed against a reference surface of the support. The positions of the airfoil and of the blade root can therefore be determined with great accuracy, thereby improving the quality of the radiusing that is performed. Consequently, the airfoils of the blades as radiused in this way can be correctly positioned inside the gas-flow passage.

According to another characteristic of the invention, the presser points are formed by studs, e.g. removable studs, having ends for coming into contact with the blade that do not have any sharp edges, and that are hemispherical, for example.

This characteristic makes it possible to avoid the airfoil being subjected locally to stresses that are too great and that could cause its material to recrystallize, which would degrade its mechanical characteristics.

When it is desired to radius another type of blade, it is possible merely to change the presser points while conserving the same block, thereby adapting the positions of the presser points to the shape of the airfoil. Naturally, it is also possible to change the block, should that be found to be necessary.

Advantageously, the block has an internal wall defining the opening for mounting the airfoil, from which wall there project: first, second, and third mutually spaced-apart studs for pressing on a leading edge of the blade or close thereto; a fourth stud for pressing on a trailing edge of the blade or close thereto; a fifth stud for pressing in register with the movable presser finger; and a sixth stud for pressing against a platform of the blade.

It should be observed that none of the studs presses against the blade root, thereby making it easier to radius. The position of each of the above-mentioned studs also makes it possible to hold the blade in position effectively and accurately.

Preferably, the block has two studs for pressing against the platform of the blade before the blade is clamped by the movable presser finger, the platform being spaced apart from said studs after the blade has been clamped.

The two above-mentioned studs serve to pre-position of the blade before clamping and they make it possible to avoid the airfoil pivoting into a wrong position during clamping by means of the movable presser finger.

In an embodiment, the block includes a hole for passing the movable presser finger.

By way of example, the block is formed of two jaws that are hinged to each other at one end and fastened to each other at another end.

Also, the means for actuating the movable presser finger may comprise a cam fitted with an actuation handle, and turning the cam with the help of the handle causes the movable presser finger to move.

Under such circumstances, the device may include an abutment suitable for limiting the angular stroke of the actuation handle.

In advantageous manner, the support includes a plurality of housings, each for mounting a respective block and blade.

A plurality of blade roots can then be radiused in a single operation.

According to another characteristic of the invention, the support includes means for retaining the block inside the corresponding housing, such as latches.

The block can thus be held in the housing of the support even when the bearing finger is in the release position.

The invention can be better understood and other details, characteristics, and advantages invention appear on reading the following description made by way of nonlimiting example and with reference to the accompanying drawings, in which:

BRIEF DESCRIPTION OF THE SEVERAL VIEWS OF THE DRAWINGS

FIG. 1 shows a device for holding a turbine engine blade for machining purposes, in particular for radiusing. The device comprises a support 1 of generally rectangular shape that is movable in rotation about its longitudinal axis A. The support 1 is mounted in bearings at its two ends 2, 3, one of these ends 2 being driven in rotation by an electric motor 4 and control means.

DETAILED DESCRIPTION OF THE INVENTION

Figure 1:
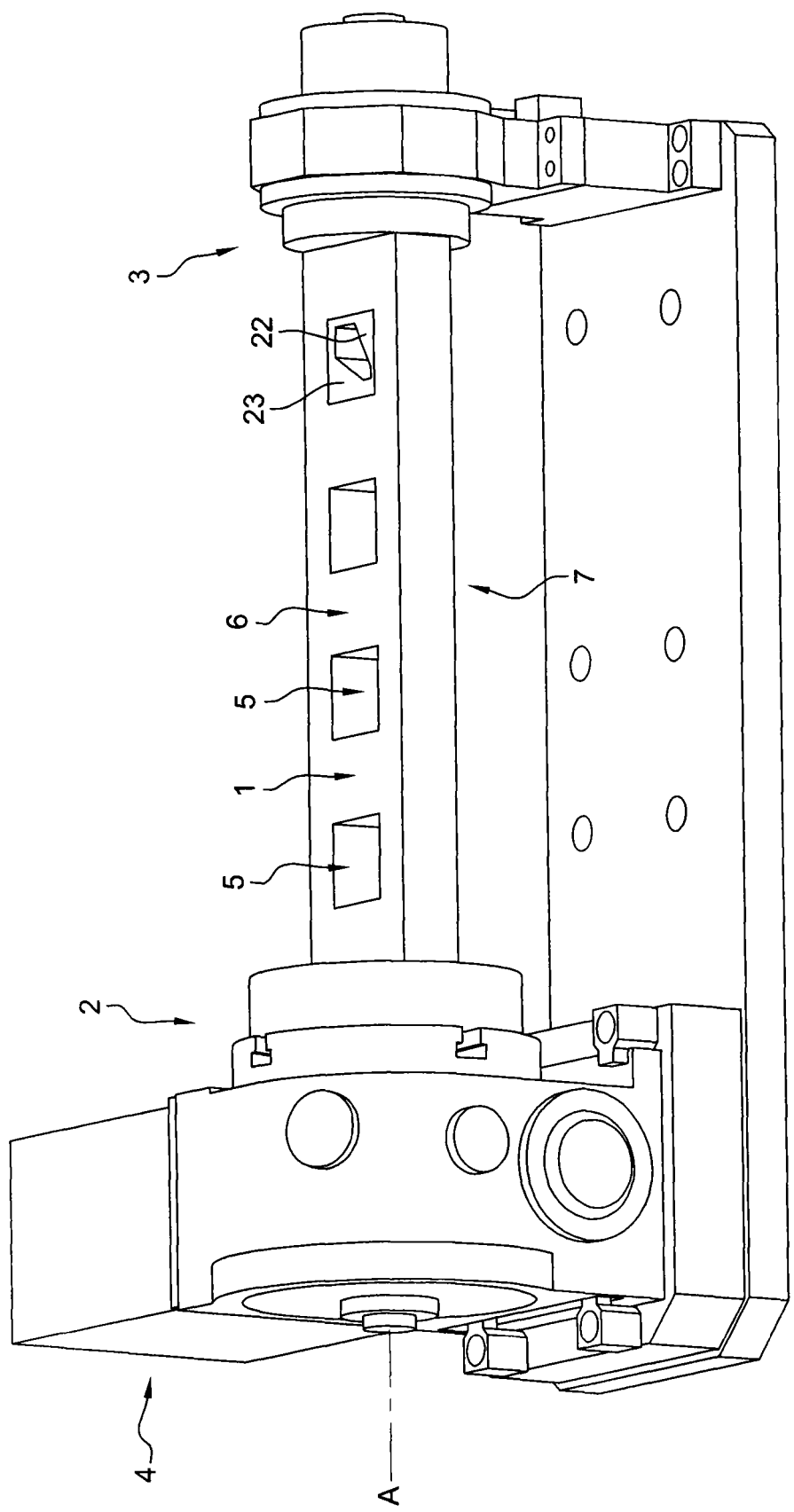
FIG. 1 is a perspective view of a blade holder device of the invention.

In the embodiment of FIG. 1, the support 1 has four housings 5 of generally square shape opening out on either side of the support 1 in surfaces referred to below as a top surface 6 and a bottom surface 7, with "top" and "bottom" being relative to their position shown in FIG. 1.

Figure 2:
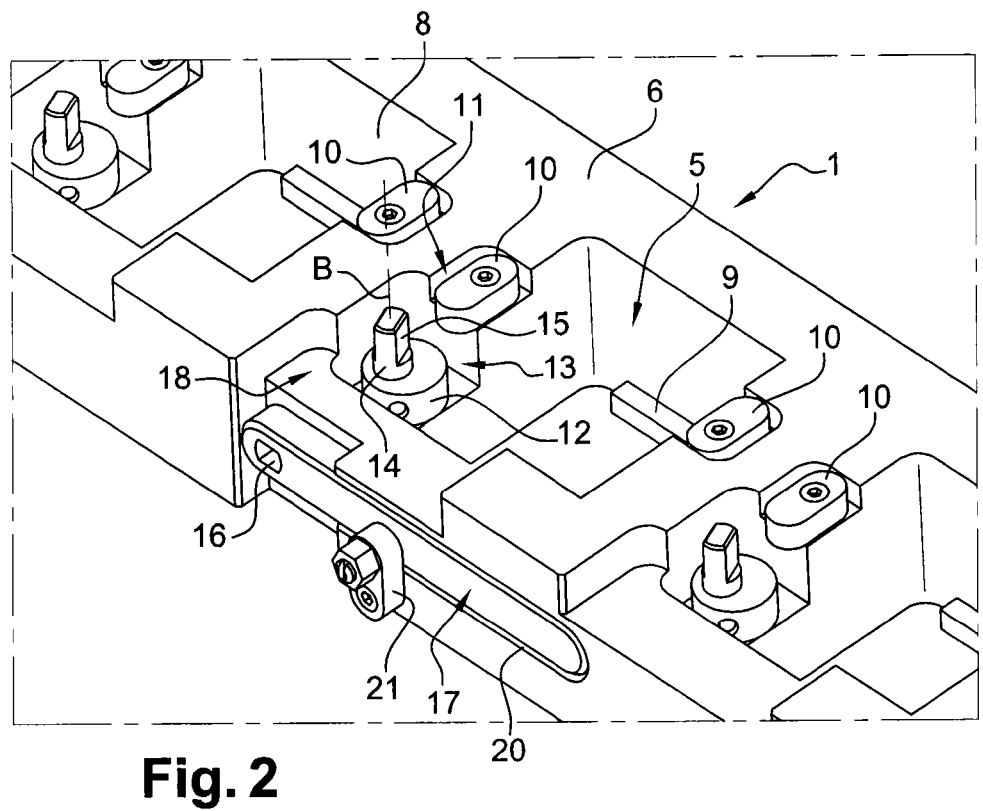
FIG. 2 is a perspective view on a larger scale of a portion of the support.

As can be seen more clearly in FIG. 2, the inside walls 8 of the housings 5 have longitudinal projections 9 for forming abutments that are arranged at the bottom ends of the housings 5 and that are situated facing each other.

The support 1 is also fitted with latches 10 arranged at the top ends of the housings, the latches 10 being movable between an unlocking position (FIG. 2) in which they are fully received in recesses 11 of the support 1, and a locking position (FIG. 3) in which they extend across the corresponding housing 5.

The support also includes a cam 12 that is received in a recess 13 of the support 1. The cam 12 is cylindrical in shape and is mounted to pivot on the support 1 about an axis B that is offset from the geometrical center of the cam 12. In this way, the cam 12 can pivot between a retracted position (FIG. 2) in which it is fully received in the above-mentioned recess 13, and a deployed position in which it extends across the housing 5.

The cam 12 has a cylindrical stud 14 extending upwards along the axis B, with the free end thereof including a flat 15 for inserting in a hole 16 of complementary shape in a handle 17 for actuating the cam 12.

Figure 9:
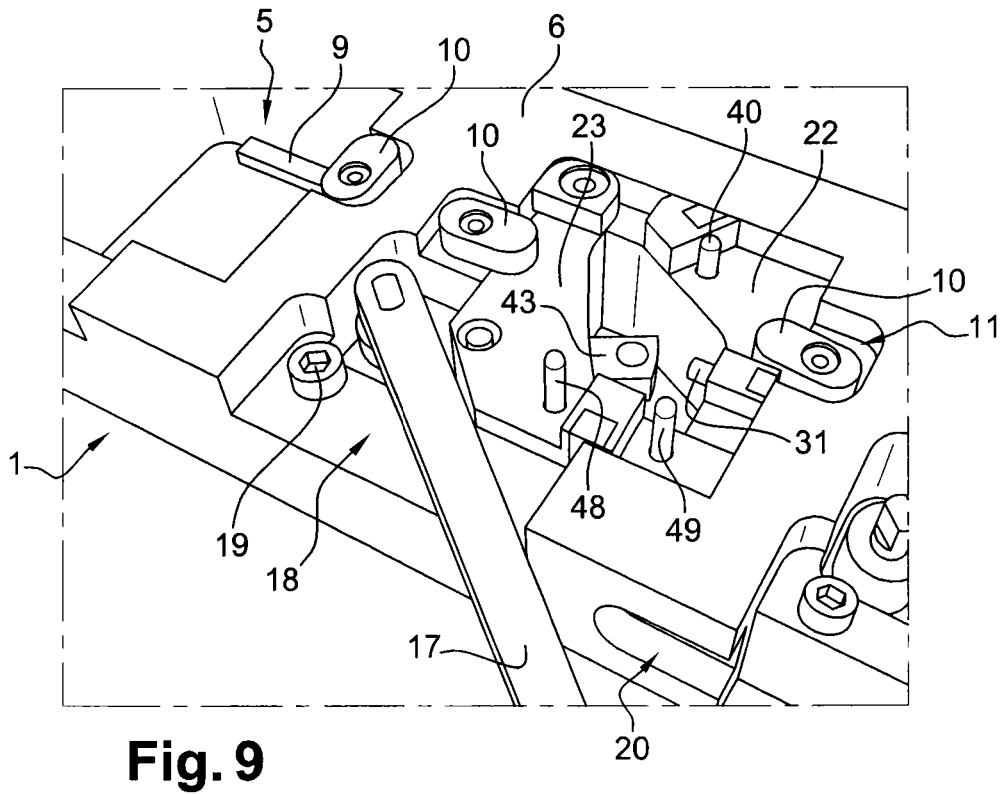
FIGS. 9 and 10 are perspective views showing a portion of the device, respectively before and after clamping.
Figure 10:
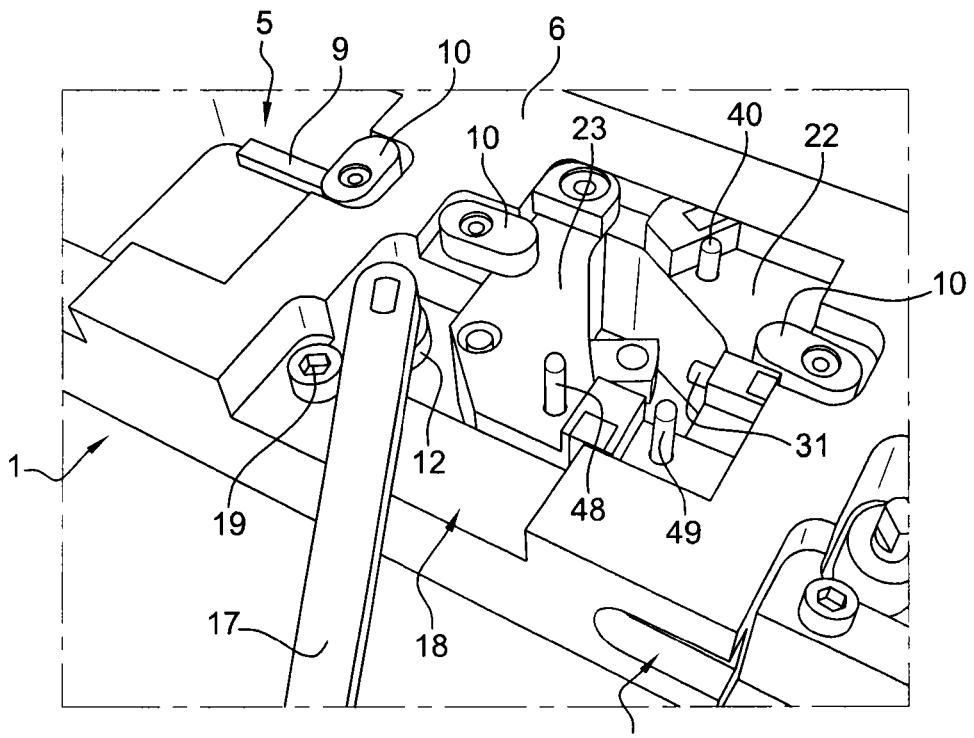

The top end of the stud 14 does not project beyond the top plane of the support 1. A lateral recess 18 is also made in the top surface 6 of the support 1 so as to allow the handle 17 to be mounted on the stud 14 of the cam 12 and also so as to allow the handle 17 to move angularly in order to drive the cam 12. An abutment 19 (FIGS. 9 and 10) may also be provided on the support 1 so as to limit the stroke of the handle 17. By way of example, this abutment may be formed by the head 19 of a screw.

While it is not in use, the handle 17 may be received in a lateral recess 20 of the support, and it may be held in the recess by means of a latch 21 similar to the latches 10.

The device of the invention also includes at least two jaws 22, 23, that can be seen in FIGS. 3 to 8.

Figure 4:
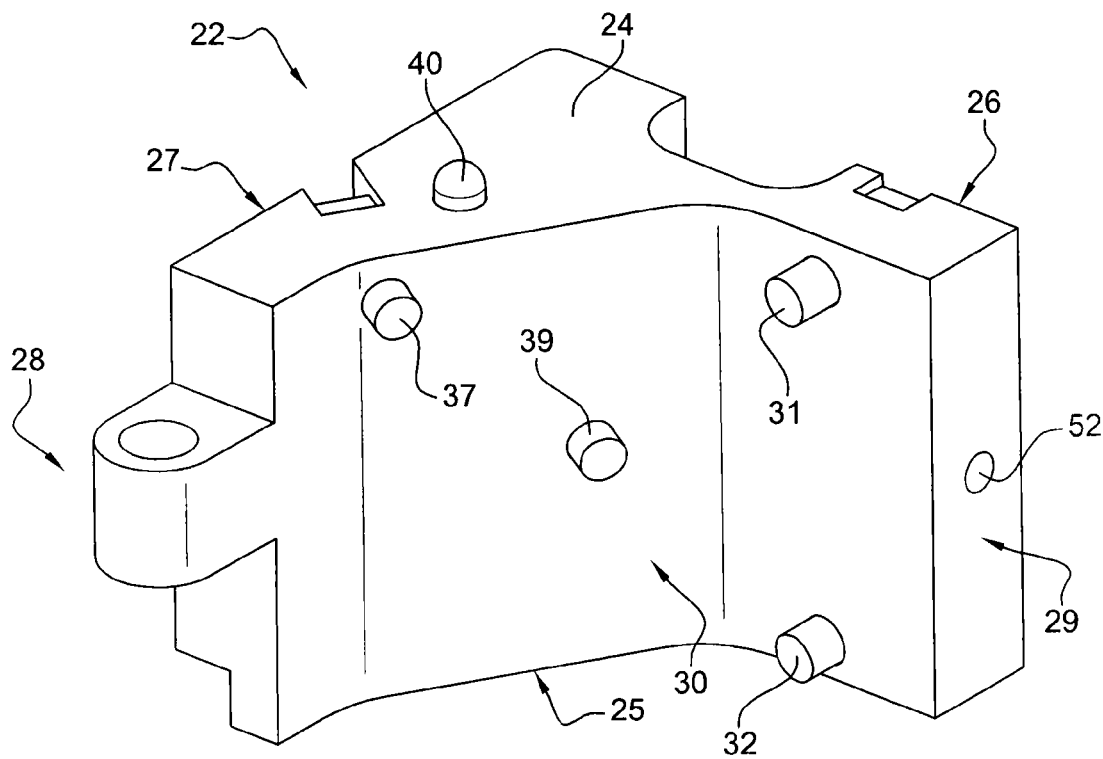
FIG. 4 is a perspective view of one of the jaws.

A first jaw 22 is shown in FIG. 4. In plan view, this jaw is generally L-shaped and has a top surface 24, a bottom surface 25, two lateral surfaces 26, 27 forming substantially a right angle, and first and second lateral ends 28, 29.

The lateral ends 28, 29 are connected together via an internal wall 30 from which there extend studs that are to come against a suction side surface 33 of an airfoil 34 of a blade 35.

Figures 11, 12:
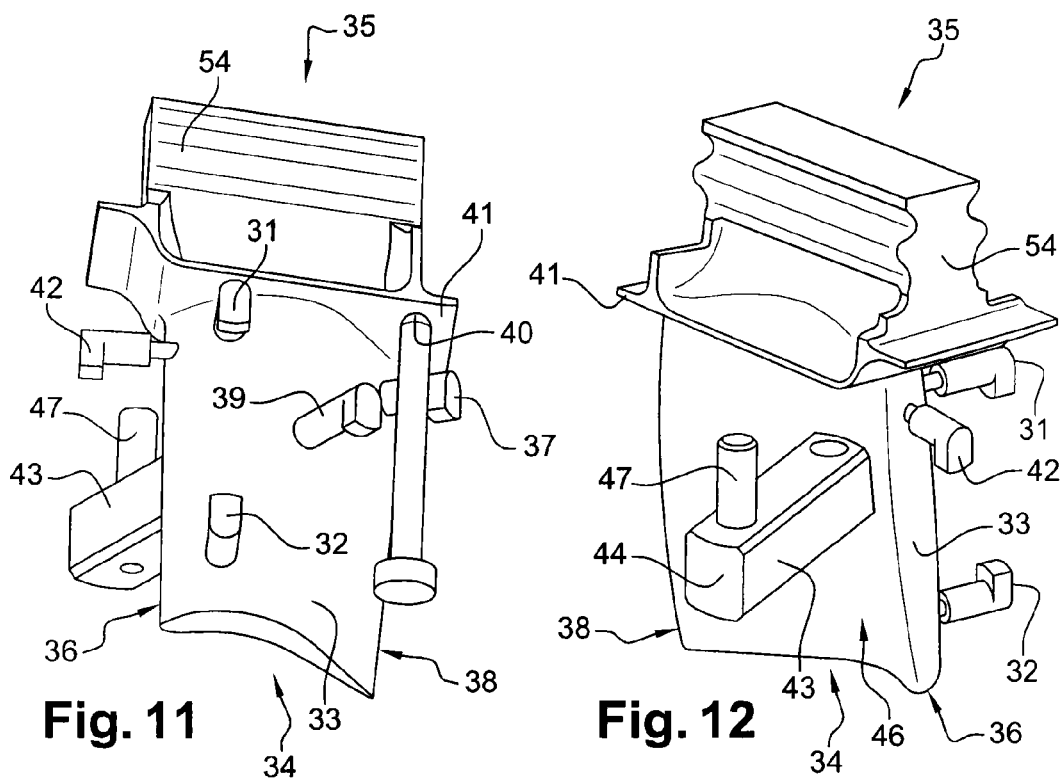
FIGS. 11 and 12 show the positions of the presser studs relative to the blade.
Figure 13:
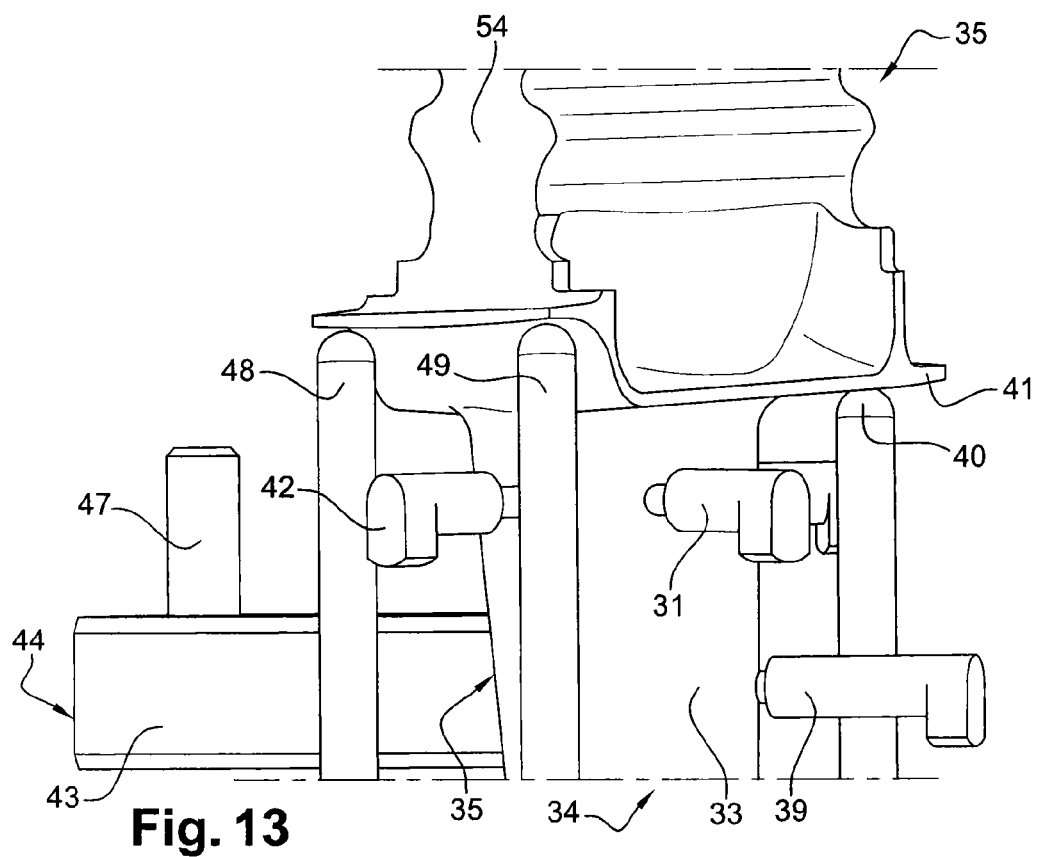
FIG. 13 is a view on a larger scale also showing the position of two temporary presser studs of the platform of the blade, before clamping the blade with the movable presser finger.

More particularly, there project from the internal wall 30: first and second mutually spaced-apart studs 31 and 32 for pressing against the suction side surface 33 of the airfoil 34 close to a leading edge 36 of the blade 35; a third stud 37 for pressing against said suction side surface 33 close to a trailing edge 38 of the blade 35; and a fourth stud 39 for pressing against a middle zone of the suction side surface 33 in register with a movable presser finger that is described below. The stud 39 is not shown in FIGS. 9 and 10. A fifth stud 40 projects from the top surface 24 of the first jaw 22 and is for pressing against a platform 41 of the blade 35 (FIG. 11).

Figure 5:
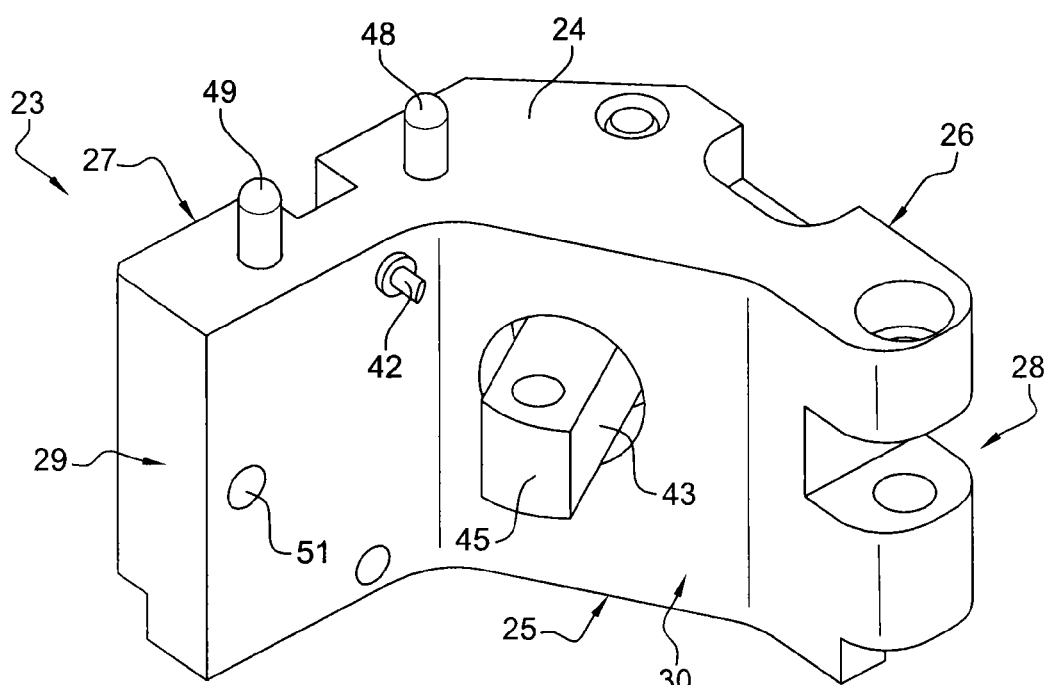
FIG. 5 is a perspective view of the other jaw and of a presser finger.
Figure 6:
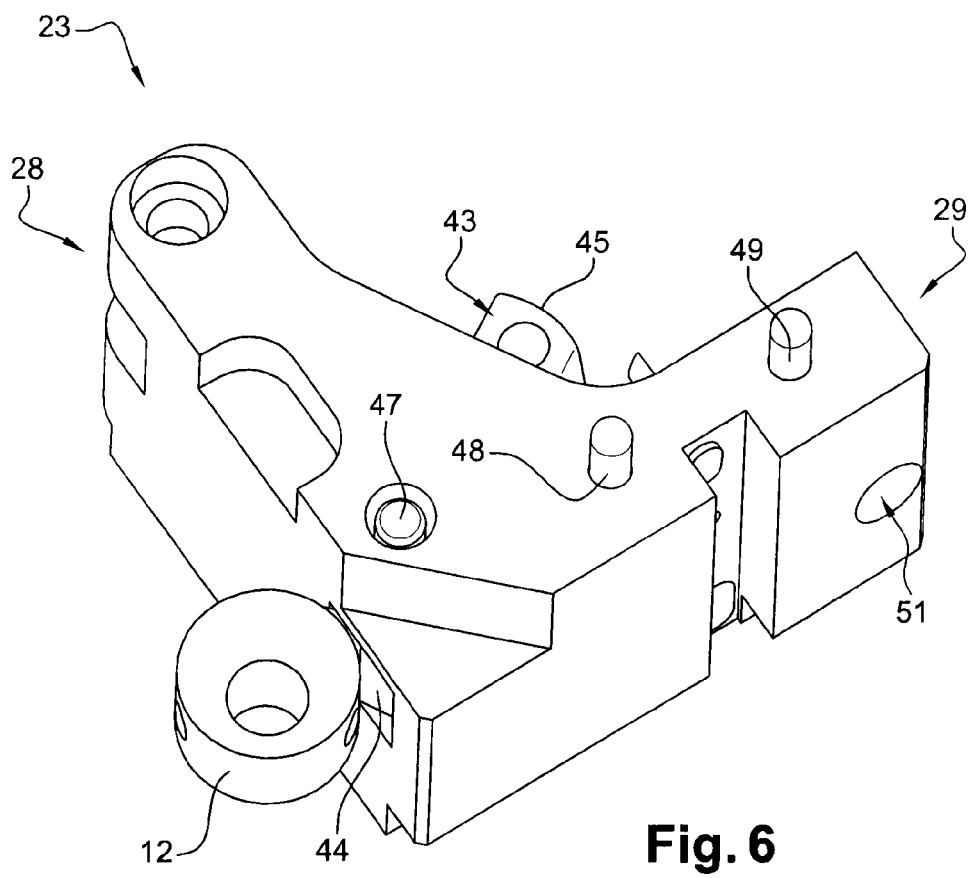
FIG. 6 is a perspective view of the machine and of the presser finger of FIG. 5, together with the cam for actuating said presser finger.
Figure 7:
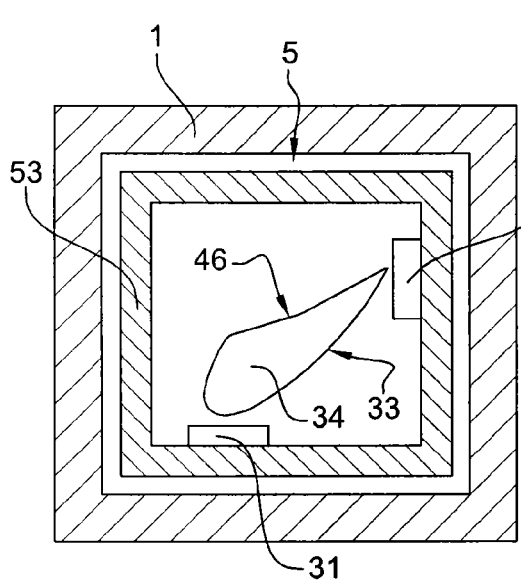
FIGS. 7 and 8 are diagrammatic plan views showing a portion of the device and of a blade, respectively before and after clamping the blade.
Figure 8:
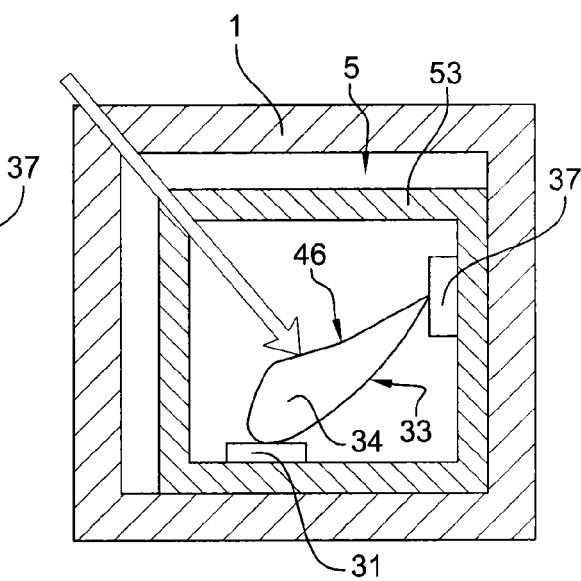

As can be seen in particular in FIGS. 5 and 6, in plan view, the second jaw 23 is also generally L-shaped and has a top surface 24, a bottom surface 25, two lateral surfaces 26 and 27 forming substantially a right angle, and first and second lateral ends 28, 29.

The lateral ends 28, 29 of the second jaw 23 are connected together via an internal wall 30 from which there extends a stud 42 that is to press against the suction side surface 33 of the blade 35, in the vicinity of the leading edge 36 of the blade 35.

The studs 31, 32, 37, 39, 40, and 42 to form six reference presser points enabling the blade 35 to be properly positioned in the jaws 22 and 23.

The second jaw 23 also has a hole passing therethrough, opening out in the wall 30 and for use in mounting a presser finger 43 that is to press via a first end 44 (FIG. 6) against the cam 12, and via a second end 45 against the pressure side surface 46 (FIG. 12) of the airfoil 34 of the blade 35, substantially in register with the stud 39. The second end 45 of the presser finger 43 presents a rounded surface matching the pressure side surface 46 in the corresponding pressing zone.

The movable presser finger 43 is slidably mounted in the second jaw 23 to move between a release position in which it does not press against the pressure side surface 46 of the airfoil 34, and a clamping position in which it presses against this surface 46. The movable finger 43 is caused to slide by the cam 12 turning between its retracted and deployed positions. The presser finger 43 may be returned to its release position manually or with the help of resilient return means, e.g. with the help of a spring.

In a variant (not shown), the presser finger 43 may be pivotally mounted on the jaw 23 to pivot between a release position and a clamping position.

Two mutually spaced-apart studs 48, 49 also project from the top wall 24 of the second jaw 23, and they come to press against the platform 41 of the blade 35, prior to the blade 35 being clamped by the movable presser finger 43, as described in greater detail below. These studs 48, 49 are not shown in FIGS. 11 and 12 in order to make the drawings more readable.

The studs 31, 32, 37, 39, 40, 42, 48, and 49 and the presser finger 43 may be removable so as to enable them to be changed in order to adapt to airfoils 34 of different shapes or dimensions. The ends of the studs pressing against the airfoil 34 do not have any sharp edges, and by way of example they may be hemispherical or frustoconical.

Figure 3:
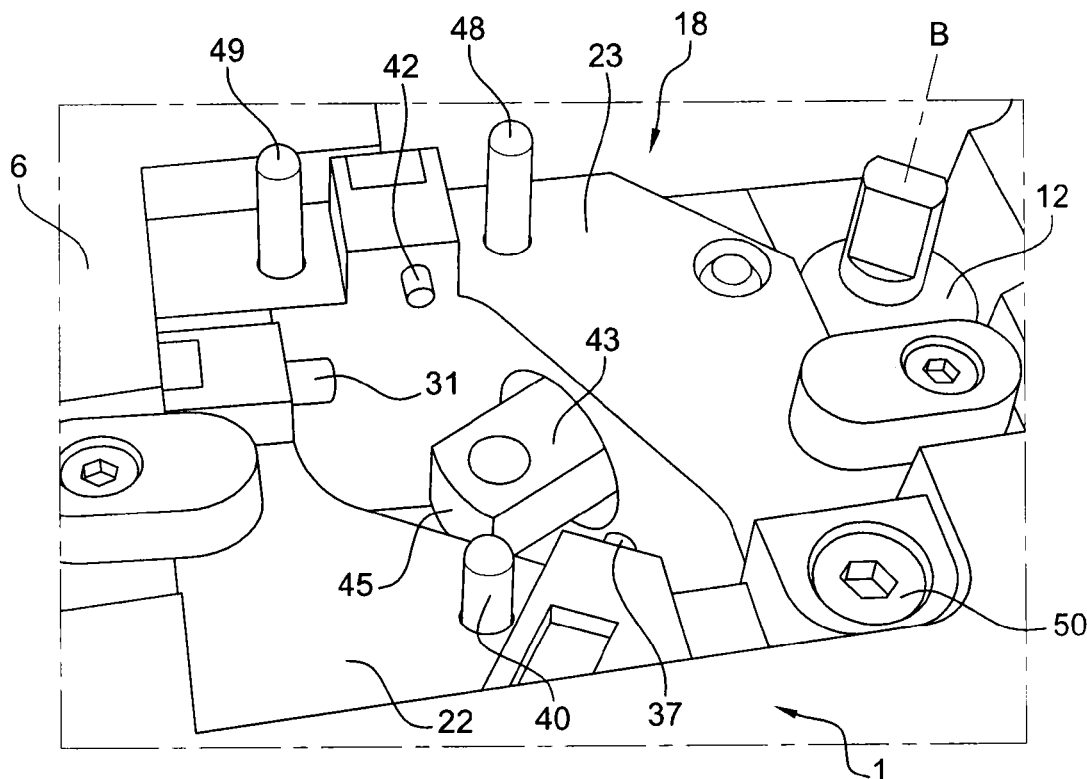
FIG. 3 is a view on a larger scale and in perspective of a housing of the support in which two jaws are mounted.

The first ends 28 of the jaws 22, 23 form a hinge enabling the jaws to be opened and closed by pivoting about an axis, which is constituted by a screw 50 (FIG. 3). The second ends 29 of the jaws 22, 23 may be fastened to each other via a screw mounted in a hole 51 of the second jaw 23 (FIG. 5) and screwed into tapping 52 in the first jaw 22 (FIG. 4). Once the jaws 22 and 23 have been fastened together they form a block 53 that is shown diagrammatically in FIGS. 7 and 8. In these diagrammatic figures, only the presser studs 31 and 37 are shown, and they are not represented pictorially.

In a variant, the jaws 22 and 23 may be replaced by a one-piece unit, without that modifying the operation of the invention.

The operation of the device is described below.

Prior to mounting a blade 35, a block 53 is mounted in at least one of the housings 5 of the support 1. The block 53 is made up of two jaws 22 and 23 that are fastened together and that are fitted with presser studs 31, 32, 37, 39, 40, 42, 48, and 49 and with a movable presser finger 43. The block 53 rests on the abutments 9 and is retained in the corresponding housing by the latches 10. The cam 12 is in the retracted position and the presser finger 43 is in the release position.

The airfoil 34 of a blade 35 can then be inserted in the space defined between the jaws 22 and 23 of the block 53, until the platform 41 of the blade 35 presses against the studs 48, 49 in provisional manner.

The cam 12 is then actuated by an operator using the handle 17 so as to move the presser finger 43 towards its clamping position. The presser finger 43 then presses the blade 35 towards the studs 31, 32, 37, 39, 40, and 42, thus also pressing the block 53 back against the inside wall of the housing 5 of the support 1. Thus, in a single clamping action, the airfoil 34 of the blade 35 is held stationary by the presser finger 43 against the block 53, which itself is held against the support 1.

The blade 35 can then be machined, and in particular the blade root 54 can then be radiused, with the help of a numerically-controlled machine, in the same manner as in document FR 10/57384. The positioning of the presser points, of the jaws 22, 23, and the turning of the support 1 about its axis A give easy access to all of the zones that are to be machined. Also, since the airfoil 34 is positioned accurately relative to the support 1, it is also possible to perform the radiusing of the blade root 54 accurately and in reproducible manner.

Naturally, an airfoil 35 may be mounted in each of the housings 5 of the support 1, so that a plurality of blades 35 can be radiused in a single operation.

The blade 35 is removed by turning the handle 17 and the cam 12 in the opposite direction, thereby moving the presser finger 43 towards its release position.

The block 53 and/or the studs 31, 32, 37, 39, 40, 42, 48, and 49, and the presser finger 43 may also be changed easily, when it is desired to machine a blade of a different type. Specifically, the positions of the presser points may vary for each type of blade.

The invention claimed is:

1. A device for holding a turbine engine blade for purposes of machining, the device comprising:
   a support including at least one housing in which at least one block is mounted in a removable manner, the block including an opening for mounting an airfoil of a blade and including at least six presser points for pressing against the airfoil; and
   a movable presser finger for pressing against a pressure side surface or a suction side surface of the airfoil via a first end having a rounded surface matching the pressure side surface or the suction side surface, the movable presser finger being movable through an interior space of the block between a first retracted position and a second deployed position for clamping the blade, wherein
   in the first retracted position, the first end of the movable presser finger does not press against the pressure side surface or the suction side surface of the airfoil, and a first gap is provided between a first exterior surface of the block and a first interior surface of the support, and a second gap is provided between a second exterior surface of the block and a second interior surface of the support, the first and second exterior surfaces of the block being opposite each other and the first and second interior surfaces of the support being opposite each other, and in the second deployed position, the first end of the movable presser finger presses the pressure side surface or the suction side surface of the airfoil against the least six presser points of the block, and pushes the block against the support such that the first exterior surface of the block abuts the first interior surface of the support to maintain the block in place, and the second gap between the second exterior surface of the block and the second interior surface of the support is greater in the second deployed position than in the first retracted position.

2. The device according to claim 1, wherein the at least six presser points are formed by studs or removable studs, including ends for coming into contact with the blade that do not have any sharp edges or that are hemispherical.

3. The device according to claim 2, wherein the block includes an internal wall and a top surface defining the opening for mounting the airfoil;
 a first stud, a second stud, and a third stud protruding from the internal wall and mutually spaced-apart for pressing against the pressure side surface or the suction side surface;
 a fourth stud protruding from the internal wall for pressing against a trailing edge or leading edge of the blade or close thereto;
 a fifth stud protruding from the internal wall for pressing in opposite direction to the movable presser finger; and
 a sixth stud protruding from the top surface for pressing against a platform of the blade.

4. The device according to claim 3, wherein the block includes a seventh stud and an eighth stud protruding from the top surface for pressing against the platform of the blade before the blade is clamped by the movable presser finger, the platform being spaced apart from the seventh stud and the eighth stud after the blade has been clamped.

5. The device according to claim 1, wherein the block includes a hole for passing the movable presser finger.

6. The device according to claim 1, wherein the block includes two jaws that are hinged to each other at one end and fastened to each other at another end.

7. The device according to claim 1, wherein the movable presser finger is connected to a cam actuated by a handle to move the movable presser finger in the position for clamping the blade.

8. The device according to claim 7, further comprising an abutment for limiting an angular stroke of the handle.

9. The device according to claim 7, wherein the cam is in contact with the presser finger and rotates around an offset pivot to articulate the presser finger from the first retracted position to the second deployed position.

10. The device according to claim 9, wherein the presser finger further includes a spring to be articulated from the second deployed position to the first retracted position.

11. The device according to claim 9, wherein the cam is placed in a recess of the support outside the housing.

12. The device according to claim 1, wherein the support includes a plurality of housings, each housing for mounting a respective block and blade.

13. The device according to claim 1, wherein the support includes latches which retain the block inside a corresponding housing.

* * * * *